US007113447B1

(12) United States Patent
Matthews et al.

(10) Patent No.: US 7,113,447 B1
(45) Date of Patent: Sep. 26, 2006

(54) LASER PUMPED COMPACT ACOUSTIC SENSOR SYSTEM

(75) Inventors: Anthony D. Matthews, Panama City Beach, FL (US); Victor Johnson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 171 days.

(21) Appl. No.: 10/943,830

(22) Filed: Sep. 13, 2004

(51) Int. Cl.
*G03H 3/00* (2006.01)
*H04R 1/00* (2006.01)

(52) U.S. Cl. .......................... 367/7; 367/152; 367/149; 356/28.5

(58) Field of Classification Search .................... 367/7, 367/10, 128, 141, 149, 150, 152, 173; 356/28, 356/28.5; 73/657
See application file for complete search history.

(56) References Cited

U.S. PATENT DOCUMENTS

| | | | | |
|---|---|---|---|---|
| 3,706,965 A | * | 12/1972 | Korpel | 367/7 |
| 3,723,958 A | * | 3/1973 | Heflinger | 367/7 |
| 4,905,202 A | * | 2/1990 | Robillard | 367/10 |
| 5,379,270 A | * | 1/1995 | Connolly | 367/128 |
| 5,392,258 A | * | 2/1995 | Gabrielson et al. | 367/149 |
| 5,734,623 A | * | 3/1998 | Ruffa | 367/128 |
| 6,081,481 A | * | 6/2000 | Sabatier et al. | 367/8 |
| 6,697,302 B1 | * | 2/2004 | Cray et al. | 367/141 |
| 6,859,419 B1 | * | 2/2005 | Blackmon et al. | 367/134 |

OTHER PUBLICATIONS

Sabatier et al, "An investigation of acoustic-to-seismic coupling to detect buried antitank landmines" Geoscience and Remote Sensing, IEEE Transactions on vol. 39, Issue 6, Jun. 2001 pp. 1146-1154 Digital Object Identifier 10.1109/36.927429.*

* cited by examiner

*Primary Examiner*—Ian J. Lobo
(74) *Attorney, Agent, or Firm*—James T. Shepherd

(57) ABSTRACT

An acoustic transducer system for acoustic signals in water has at least one hollow spherically-shaped shell for vibrating in response to acoustic signals impinging from the water. The hollow spherically-shaped shell has one or more portions that are reflective of impinging radiation, and a resilient matrix in contact with the water resiliently supports the responsive hollow shell. A laser Doppler velocimeter transmits radiation onto the reflective portion (portions) and receives reflected radiation from the reflective portion (portions). The reflected radiation generates signals in the laser Doppler velocimeter that are representative of the acoustic signals from the water medium. A computer receives the representative signals from the laser Doppler velocimeter and displays them on an interconnected display to determine direction and range to a target. The acoustic signals can originate from the target or can be reflected portions of acoustic energy transmitted from an acoustic projector.

36 Claims, 5 Drawing Sheets

LASER PUMPED COMPACT ACOUSTIC SENSOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system for sensing acoustic signals. More particularly, this invention relates to a compact sensor of acoustic energy relying on a laser Doppler velocimeter and at least one hollow spherically-shaped shell vibrationally displaceable by impinging acoustic signals.

Many conventional acoustic transducers are made from arrays of ferroelectric and/or magnetostrictive transducer elements that typically can extend in lengths from ten to one hundred times the wavelengths of the frequencies of interest. These costly arrangements can be not only massive and cumbersome arrangements but may require elaborate support structure and have excessive power requirements.

Thus, in accordance with this inventive concept, a need has been recognized in the state of the art for a cost effective, relatively compact acoustic sensor system operable in the passive and/or active modes and having a laser Doppler velocimeter and at least one hollow spherically-shaped shell vibrated by impinging acoustic energy to determine direction and range to targets of interest.

OBJECTS AND SUMMARY OF THE INVENTION

An object of the invention is to provide a high resolution, small aperture acoustic transducer system for receiving acoustic signals transmitted through water.

Another object of the invention is to provide a transducer system operable in passive and/or active modes for acoustic signals in water.

Another object of the invention is to provide a transducer system receiving acoustic signals to determine direction and/or range to a target.

Another object of the invention is to provide a transducer system having at least one laser Doppler velocimeter to sense vibrations of at least one reflective portion of a surface displaced by acoustic energy.

Another object of the invention is to provide a transducer system having a laser Doppler velocimeter to sense vibrations of a reflective portion of a surface displaced by acoustic signals reflected from a target.

Another object of the invention is to provide a transducer system having a laser Doppler velocimeter to sense vibrations of a reflective portion on an outer surface displaced by acoustic signals created at and transmitted from a target.

Another object of the invention is to provide a transducer system having a laser Doppler velocimeter for sensing vibrations of at least one reflective portion on an outer surface of a hollow spherically-shaped shell displaced by impinging acoustic signals.

Another object of the invention is to provide a transducer system having a laser Doppler velocimeter for sensing vibrations of a pattern of reflective portions on an outer surface of a hollow spherically-shaped shell displaced by acoustic signals.

Another object of the invention is to provide a transducer system having a laser Doppler velocimeter for sensing vibrations of a reflective portion of an outer surface of a hollow spherically-shaped shell dimensioned for resonance with at least one frequency of impinging acoustic signals.

Another object of the invention is to provide a transducer system having a laser Doppler velocimeter for sensing vibrations of a pattern of reflective portions on an outer surface of a hollow spherically-shaped shell dimensioned for resonance with at least one frequency of impinging acoustic signals.

These and other objects of the invention will become more readily apparent from the ensuing specification when taken in conjunction with the appended claims.

Accordingly, the present invention is to an acoustic transducer system for acoustic signals transmitted through a water medium to determine direction and range to a source of the acoustic signals. At least one hollow spherically-shaped shell for vibrating in response to acoustic signals impinging from the water has one or more portions that are reflective of impinging radiation, and a resilient matrix in contact with the water resiliently supports the responsive hollow shell. A laser Doppler velocimeter transmits radiation onto the reflective portion (portions) and receives reflected radiation from the reflective portion (portions). The reflected radiation generates signals in the laser Doppler velocimeter that are representative of the acoustic signals from the water medium. A computer receives the representative signals from the laser Doppler velocimeter and displays them on an interconnected display to determine direction and range to a target. A plurality of hollow shells each having a number of reflective portions can be each disposed in a resilient matrix and can each be differently dimensioned to resonate at different frequencies to enhance the reflected radiation for determining range and direction to a source of the acoustic signals.

DESCRIPTION OF THE PREFERRED EMBODIMENTS

Figure 1:
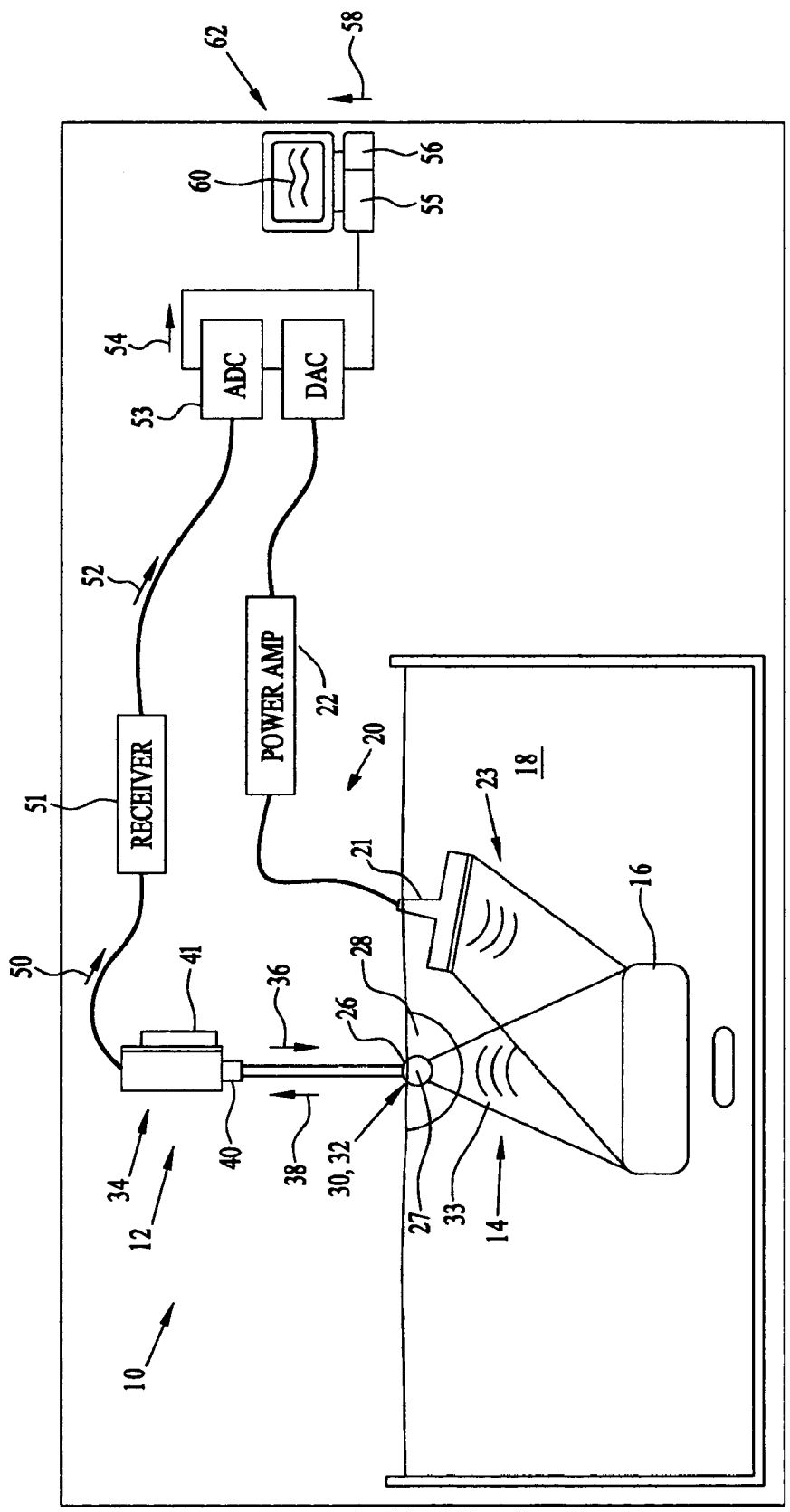
FIG. 1 schematically shows the acoustic transducer system of the invention for receiving acoustic signals from a water medium.
Figure 2:
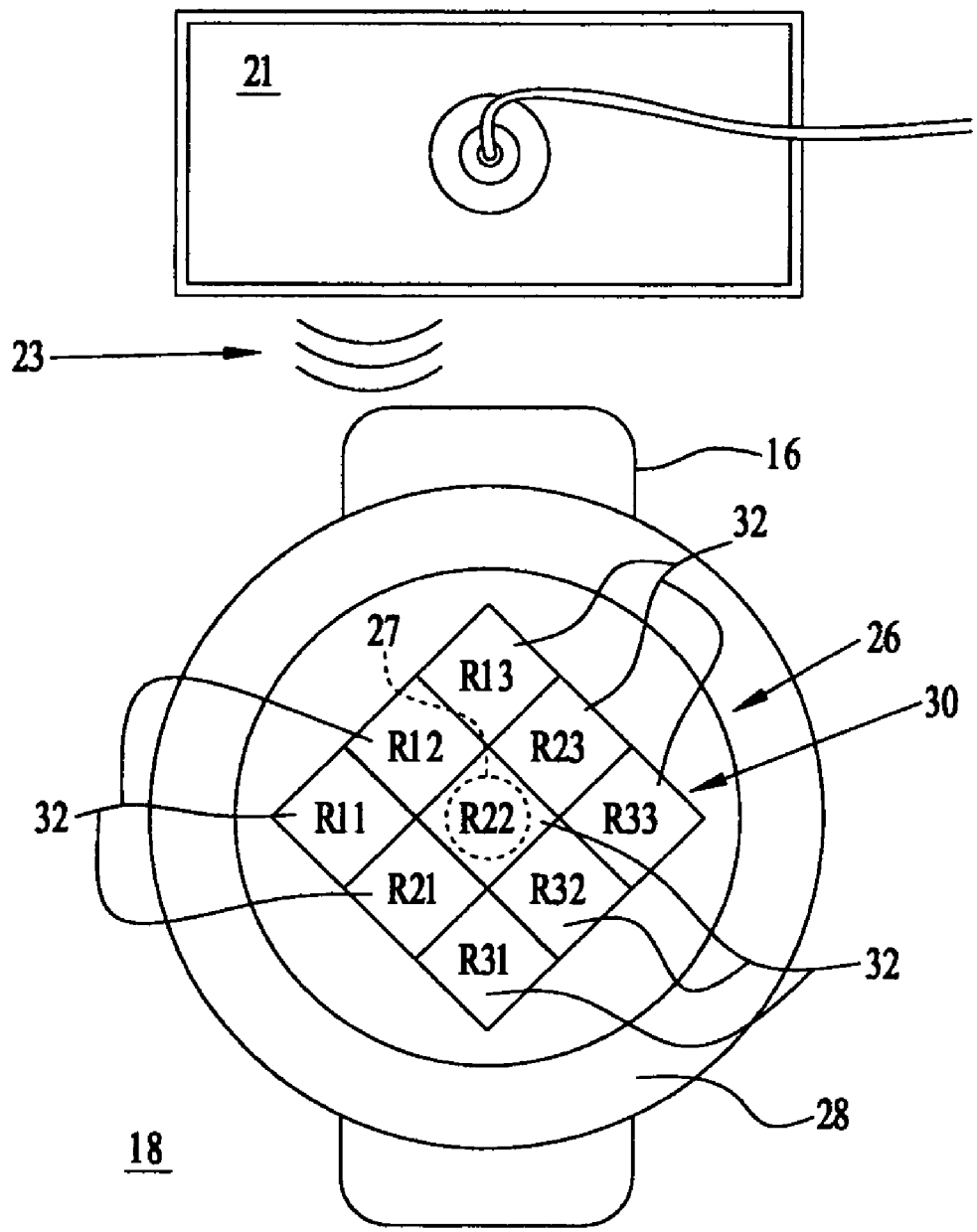
FIG. 2 is a schematic top view of a hollow spherically-shaped shell having an exemplary pattern of reflective portions for reflecting impinging radiation.

Referring to FIGS. 1 and 2, an acoustic transducer system 10 of the invention has a receiver section 12 for receiving acoustic signals 14 from a target 16 in ambient water 18. Acoustic signals 14 can be processed in system 10 to reveal the location of target 16 in both direction and range. Acoustic transducer system 10 also can have an acoustic transmitter section 20 provided with an acoustic transducer 21 driven by a power amplifier 22 for transmitting acoustic signals 23 through water 18 to target 16.

The acoustic signals 14 from target 16 can be generated in and emitted from target 16 from, for example, on-board machinery, or signals 14 can be reflected from target 16. Thus, acoustic transducer system 10 can operate in the passive mode when acoustic signals 14 are generated by target 16, and system 10 can also be operated in the active mode when acoustic signals 14 are portions of projected acoustic signals 23 that are reflected from target 16 in the form of echoes.

Receiver section 12 has a hollow spherically-shaped shell structure 26 that vibrates when the acoustic energy of acoustic signals 14 in water 18 impinges upon it. Hollow spherically-shaped shell structure 26 has flexibility and low mass loading to undergo responsive cyclic compression and rarefaction reactions to impinging acoustic signals 14. Hollow shell 26 such as an air-filled ping-pong ball, for example, could be selected for acceptable responses for some applications. Other plastic or similar flexible, low mass materials could be used to make hollow shell 26 that is displaceable in responsive vibratory motion when ensonified by impinging acoustic signals 14. The differently fabricated shells could be made larger or smaller, have different wall thicknesses, be pressurized, or filled with different fluids or substances to exhibit resonances at different frequencies of acoustic signals 14.

Hollow shell 26 is held or positioned in a resilient matrix 28. An upper outer surface 30 of shell 26 can be slightly covered by only a few mils of resilient matrix 28, or surface 30 can extend above resilient matrix 28 as shown in FIG. 1. Resilient matrix 28 has a density and/or composition to transmit acoustic signals 14 virtually the same as ambient water 18 (including transmission of acoustic signals 14 at the same velocity). Therefore, resilient matrix 28 vibrates in response to acoustic signals 14 that impinge from ambient water 18, and these responsive vibrations are transmitted to vibrational hollow shell 26. Non-water soluble gelatin has been successfully used as resilient matrix 28, and can be formed in different shapes including the dome-shaped layer of resilient matrix that is depicted and is in contact with water 18. Shaping resilient matrix 28 in the dome shape makes the path through resilient matrix 28 to shell 26 more uniform for signals 14 to avoid the problems associated with having different path lengths for signals 14 through the matrix.

Thus, responsive analog vibrations can be induced in vibrational hollow shell 26, especially at its resonant frequency which for the exemplary ping pong ball is 18.33 KHz. Other suitable materials for resilient matrix 28 will readily suggest themselves so long as they are not water soluble and have sound transmissive properties essentially the same as the surrounding water medium.

Resilient matrix 28 transmits a compression to the bottom of the exemplary ping pong ball for hollow shell 26 (caused by acoustic signals 14 passing through water 18 and impinging onto resilient matrix 28) and a rarefaction at upper outer surface 30 at the top of the shell 26. This virtually simultaneous compression and rarefaction reaction causes hollow shell 26 to move up slightly. Then, as the cyclic displacement of shell 26 by acoustic signals 14 continues, when the rarefaction moves to the bottom of shell 26, and the following compression moves to the top of shell 26, it will move slightly lower in another compression and rarefaction reaction. Impinging acoustic signals 14 at different frequencies can cause cycles of compression and rarefaction in hollow shell 26; however, these cyclic displacements are enhanced at resonance. Resonance can occur in hollow shell 26 when the diameter of shell 26 is dimensioned to be about one-half the wavelength of one frequency of acoustic signals 14. This frequency at resonance that induces or causes enhanced simultaneous compression and rarefaction reactions (or back-and-forth movements) of the ping-pong ball of hollow shell 26 is at 18.33 KHz, and this frequency could be a frequency of interest from an intended target 16. Thus, by appropriately dimensioning hollow shell 26 to resonate at a frequency of interest, it can be tuned to a selected target 16 that radiates or reflects this frequency of interest with enhanced or increased intensity to increase the possibility of detection and imaging of target 16.

Vibrational hollow shell 26 has at least one portion 32 reflective of impinging radiation on upper outer surface 30. More likely however, a pattern of separated and distinct reflective portions 32 can be applied to outer surface 30, see the exemplary pattern of reflective portions 32 having the designations: R11, R12, R13, R21, R22, R23, R31, R32, and R33 in FIG. 2. This pattern can be used to sense acoustic signals 14 within parts of a roughly cone-shaped sector 33 of ambient water 18. Each reflective portion 32 can be any one of several reflective liquids such as silver paint coated and cured on surface 30, reflective metallic or polymer materials deposited on surface 30, or highly reflective spots polished on surface 30. Irrespective of selected composition and/or application technique, reflective portions 32 on shell 30 are capable of cyclic vibrational displacements in accordance with the vibratory energy of impinging acoustic signals 14 so that the impinging acoustic signals 14 impart responsive vibrations or back-and-forth displacements of reflective portions 32.

When acoustic signals 14 from target 16 impinge on shell 30, one of reflective portions 32 that is more aligned with the origination point of signals 14 at target 16 than other reflective portions 32, will undergo greater displacements than the other reflective portions 32. The greater displacements of the most aligned reflective portion 32 can be regarded as being in a direction that coextends with a vector extending from the greater displaced reflective portion 32, through the center 27 of shell 30, and pointing to the source of impinging acoustic signals 14, the location of target 16. When acoustic signals 14 resonate with shell 30, the greater displacements of the aligned reflective portion 32 will be enhanced or further magnified to create, in effect, what is referred to as a sound vector that points in the direction to target 16.

Acoustic transducer system 10 has a laser Doppler velocimeter (LDV) 34 for transmitting a beam of emitted radiation (schematically shown as arrow 36) onto individual ones of reflective portions 32 on shell 26 and receiving a beam of reflected radiation (schematically shown as arrow 38) from individual ones of reflective portions 32. LDVs long have been used in the art as flow meters or anemometers to detect velocity of reflective particles entrained in a transparent flow. LDVs can be used as vibrometers by monitoring the cyclic Doppler shift reflected from a vibrating surface. A laser power source in an LDV, such as a helium-neon (HeNe) or Argon ion laser can emit a monochromatic laser beam with a power of about 10 mW to 20 W to give many advantages over other radiation/wave sources, including excellent frequency stability, small beam diameter (high coherence), and highly-focused energy.

Figure 3:
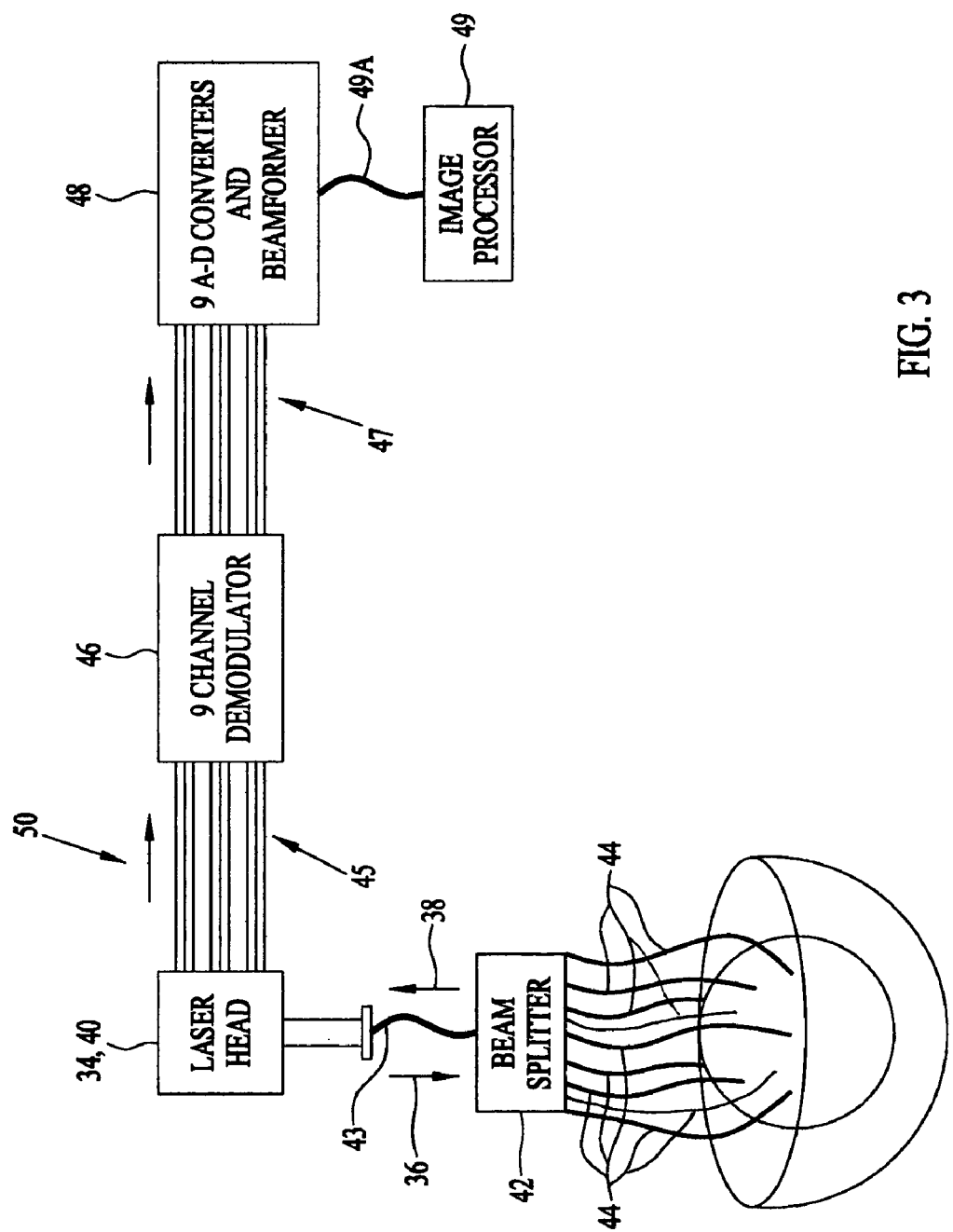
FIG. 3 shows a beam-splitter technical approach for the transmitted radiation and received reflected radiation.

A laser/laser head 40 of LDV 34 of acoustic transducer system 10 emits a monochromatic laser beam (emitted radiation 36) toward the reflective target of each of reflective portions 32 and collects the reflected radiation 38 from each of reflective portions 32. LDV 34 could be aligned with only a single reflective portion 32 that might be aligned to detect target 16 as it might pass through a particular narrow passageway in water 18, for example. Optionally, LDV 34 could distribute energy by being repositioned and realigned with respect to each reflective portion 32 in a data gathering sequence, although this procedure could be unduly time consuming. LDV 34 might distribute and collect energy by incorporating a beam scanner made up of arrangements of mirrors and lenses that can scan emitted radiation 36 to each and all reflective portions 32 in a predetermined sequence and to scan reflected radiation 38 from each and all reflective portions 32 in a predetermined sequence; however, to date limitations associated with scanning rates are being improved upon to provide more acceptable results. As a further option, LDV 34 might distribute energy to effect emission of radiation 36 to reflective portions 32 and gathering of reflected radiation 38 from reflective portions 32 by an interconnected stepping mechanism 41 that mechanically displaces LDV 34 in a pattern on reflective portions 32. In addition, and referring to FIG. 3, an optical beam-splitter 42 could be used to distribute energy in an exemplary acoustic transducer system 10. Beam splitter 42 can receive emitted radiation 36 from a nine channel optical cable 43 (e.g. nine separate optical fibers) from laser/laser head 40, split it, and couple it to nine optical fibers 44. Optical fibers 44 are of the same length and each are optically aligned and coupled to a separate one of the nine reflective portions 32 so that nine separate channels for transmission of optical analog data as emitted radiation 36 and for reception of optical analog data as reflected radiation 38 are created. A like number of optical fibers 45 to keep the flow (schematically shown as arrow) of data separate can extend from laser 40 to a nine channel demodulator 46 that is coupled via a like number of optical fibers 47 to an analog to digital converter/beam-former module 48. From module 48 the nine channels of data are connected to a computerized image processor/display 49 via another nine channel optical cable 49A.

In accordance with the Doppler effect, the change in wavelength of reflected radiation 38 is a function of the targeted object's relative velocity. In the case of acoustic transducer system 10 of the invention, the targeted object of emitted radiation 36 is each reflective portion 32, and the reflected radiation 38 from each reflective portion 32 is changed in wavelength as a function of the motion of each reflective portion 32 as it is displaced by acoustic signals 14 transmitted through resilient matrix 28 and to hollow shell 26. Thus, the velocity of displacement or frequency of displacement of each reflective portion 32 caused by the impinging acoustic signals 14 can be obtained by measuring the change in wavelength of the reflected laser light 38 to produce output signals (shown as arrow 50 in FIGS. 1 and 3) from LDV 34. Signals 50 are generated in LDV 34 by forming an interference pattern (i.e. by mixing the original or emitted radiation 36 and reflected signals or reflected radiation 38) in accordance with well known techniques. In other words, hollow spherically-shaped shell 26 moves back and forth in resilient matrix 28 (in the neighborhood between $10^{-7}$ and $10^{-10}$ meter cyclic displacements), and LDV output signals 50 are electrical signals that are the demodulated light signals characteristic or representative of these tiny movements or vibrations of shell 26 and reflective portions 32 that are caused by impinging acoustic signals 14.

Referring again to FIG. 1, acoustic transducer system 10 feeds output signals 50 from LDV 34 to a receiver/demodulator 51 including a low pass filter to obtain the frequency difference between emitted radiation 36 and reflected radiation 38 and create signals (schematically shown as arrow 52). Signals 52 are representative of acoustic signals 14 traveling through water 18 and impinging on and vibrationally displacing shell 26 and reflective portions 32. An analog to digital converter (ADC) 53 receives representative signals 52 and converts them to digital signals (shown as arrow 54) that are coupled to a computer 55. Digital signals 54 are representative of acoustic signals 14 at reflective portions 32, and computer 55 can separate digital signals 54 by a digital filter 56 into separate digital data streams (shown generally as arrow 58) that each correspond to acoustic signals 14 received at each of reflective portions 32. That is, there is one digital data stream 58 at computer 55 generated from impinging acoustic signals 14 for each reflective portion 32, and this information as well as the other information can be displayed as representative waveforms 60 of representative signals 52 on display screen 62. Waveforms 60 can include the information of many impinging acoustic signals 14 from water 18 that can cause some vibrations in hollow shell 26, but impinging acoustic signals 14 from target 16 can cause the magnified compression and rarefaction reaction of hollow shell 26 referred to above and can create an apparent sound vector that points to the direction where acoustic signals 14 from target 16 come from. This sound vector can be visualized as an imaginary line extending from the greatest displaced vibrating reflective portion 32, through center 27 of hollow shell 26, through water 18, and to target 16. In other words, the sound vector can be said to point to the origination point for the acoustic signals 14 that have been observed via reflected radiation 38 from the reflective portion 32.

Figure 4:
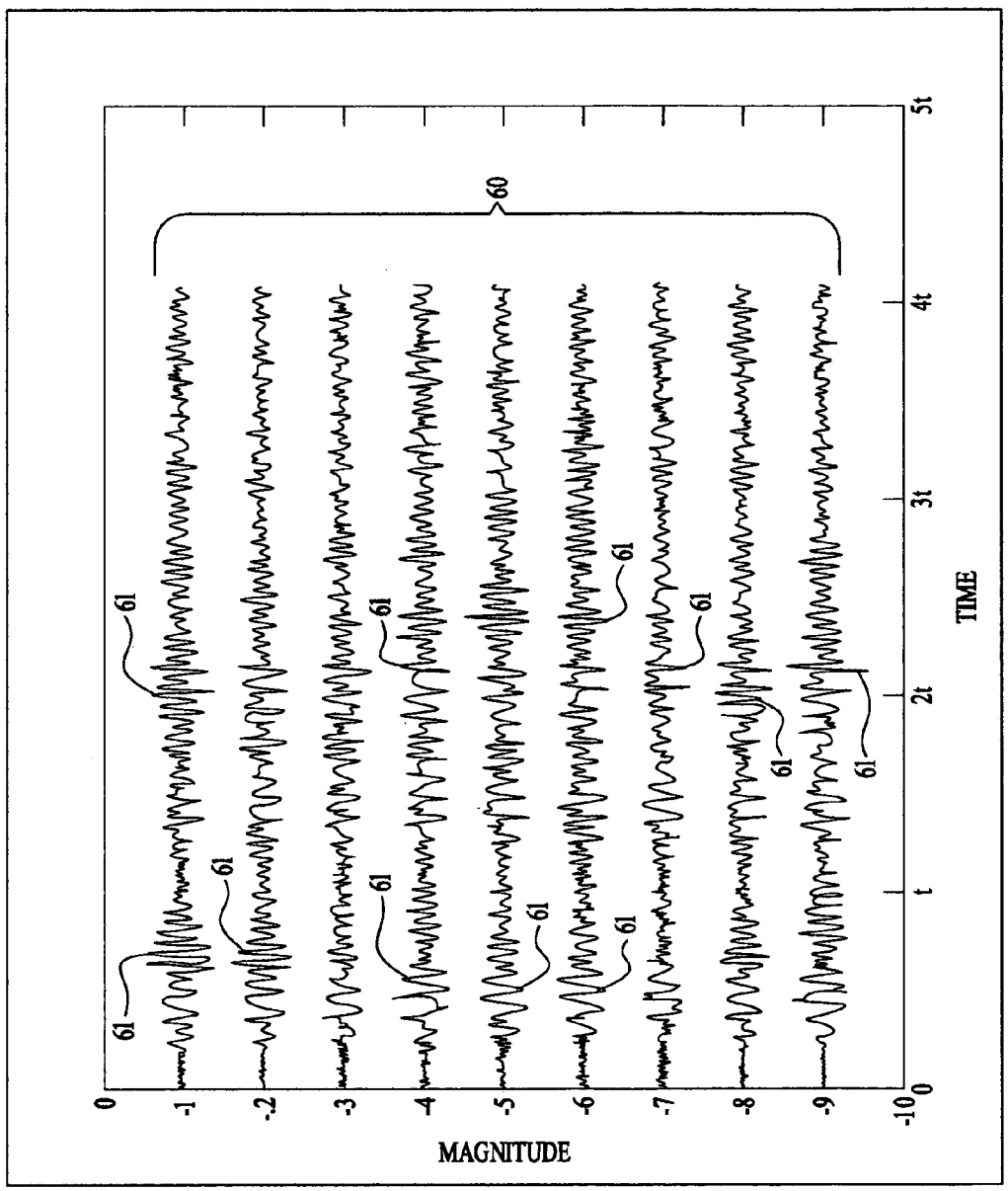
FIG. 4 schematically shows an exemplary series of planes of waveforms extending as a function of time for acoustic signals from a target.

Referring also to FIG. 4, the digital data streams 58 from digital filter 56 can be shown by computer 55 as waveforms 60 on a display screen 62 as functions of different spatial representations of acoustic signals 14 in water 18. Parts 1, 2, 3, 4, 5, 6, 7, 8, and 9 of waveforms 60 originate from reflective portions 32 of upper outer surface 30 designated R11, R12, R13, R21, R22, R23, R31, R32, AND R33 in FIG. 2. Computer 55 enables a three dimensional display of information to be thereby displayed as waveforms 60 on display 62 from which direction and/or imaging and range to target 16 can be determined, and other readouts for displaying this data can be used or other utilizations can be made in a variety of different ways as well established in the art. The signals generated as a response to the magnified compression and rarefaction reactions of reflective portions 32 on shell 26 (i.e. at resonance) can be visualized as enhanced portions 61 of waveforms 60 and portions could correspond to the shape, density or other parameters associated with target 16. It is to be noted that enhanced portions 61 are shown to define an elongate shape that roughly corresponds to the shape of target 16. Enhanced portions 61 can also be said to point to the direction of these features of target 16, and the locations of enhanced portions 61 in the x-axis direction in FIG. 4 are representative of range of target 16 from shell 26. If enhanced portions 61 were shown further to the right in waveforms 60 in FIG. 4, the range to target 16 would be greater.

The series of planes of waveforms 60 can extend as a function of time for continuous emission of acoustic signals 14 from target 16. Separate representative waveforms 60 are each generated from a separate digital data stream 58 that is representative of vibrational displacements of a separate and different reflective portion 32. Since the locations of each reflective portion 32 on shell 26 are known, and maximum magnitudes 14A of reflected acoustic signals 14 can be observed or otherwise ascertained by computer 54, the direction in three dimensions can be obtained. For example, one data stream 58 might have been derived from LDV output signals 50 from laser emitted radiation 36 reflected from reflective portion 32 designated as R11 in FIG. 2. If the magnitude of the exemplary data stream 58 is large and other data streams 58 of the other waveforms 60 are lower or non-existent, then, computer 55 could determine that target 16 is at the direction from shell 56 that is in alignment with reflective portion 32 designated R11 and center 27 of shell 26.

The frequency in acoustic signals 14 that would cause resonance of hollow shell 26 can cause enhanced induced simultaneous compression and rarefaction reactions at maximum magnitudes 61 of representative waveforms 60. The enhanced reactions are generated at resonance when the path from different reflective portions 32 and target 16 are aligned with the center of hollow shell 26. Imaging of target 16 can be made by correlating waveforms 60, particularly the portions of waveforms 60 that correspond to maximum magnitudes 61 of acoustic waveforms 14.

Computer 55 can activate power amp 22 to create interdependent, correlated sequences such as repetitive chirp pulses for range gating that takes into account time and duration of: 1.) transmission of acoustic energy 23 from projector transducer 21 of transmitter section 20, 2.) receipt of reflected acoustic signals 14 at shell 26, and 3.) activation sequences for emitting emitted radiation 36 and for receiving reflected radiation 38 at LDV 34 and processing sequences of signals 50, 52, 54, and 58 through receiver section 12. For example, if waveforms 60 were generated in this active mode of operation, the number of sequential chirps of transmitted acoustic energy 23 from transmitter section 20 is synchronized by computer 55 with acoustic signals 14 received, processed, and displayed by receiver section 12. Target information data that would correspond for greater ranges of target 16 from LDV 34 would appear further along the right of the waveforms depicted and may be characterized by higher multiples of the exemplary time parameter t. Many other well proven systems and methods for range gating can be selected as desired.

Figure 5:
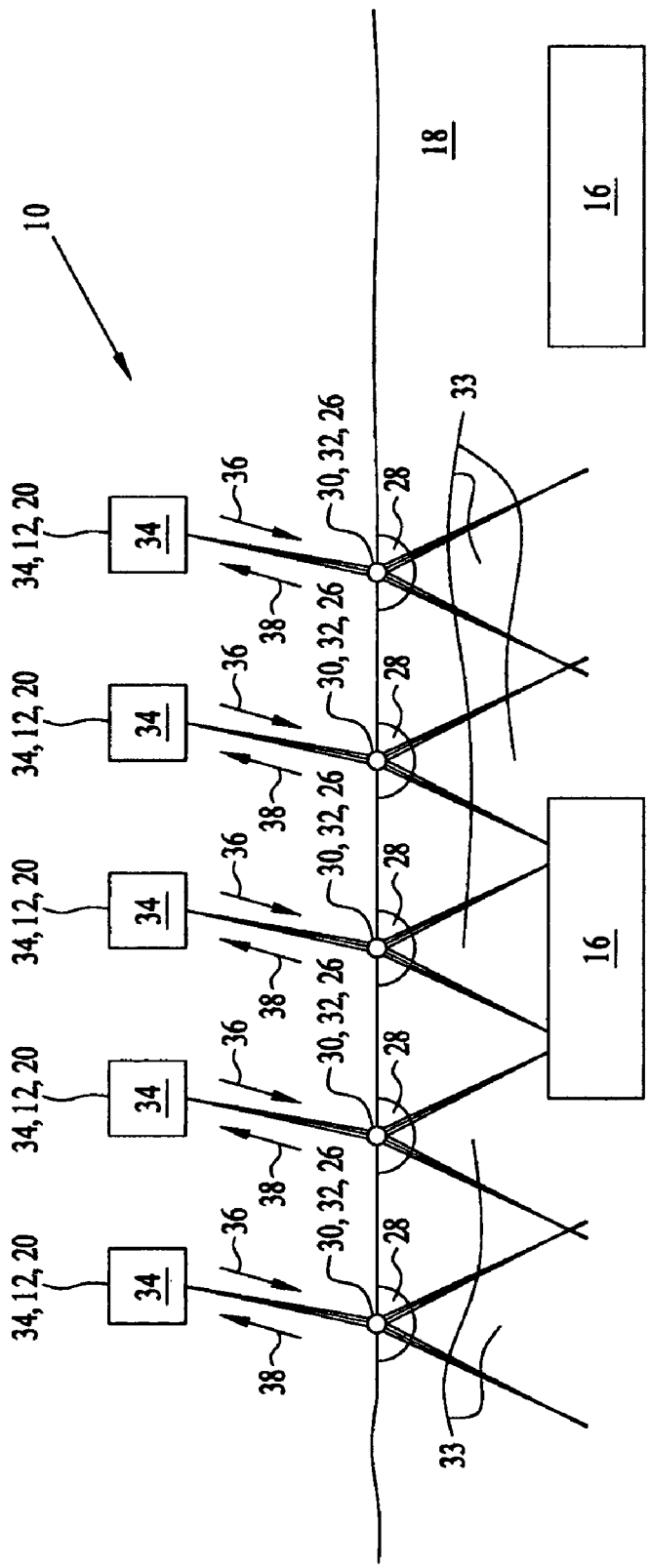
FIG. 5 shows a plurality of hollow shells each in a resilient matrix and laser Doppler velocimeters transmitting radiation and receiving reflected radiation from reflective portions on the hollow shells.

Referring to FIG. 5, acoustic transducer system 10 can have a plurality of hollow shells 26 each in a separate dome-shaped (or other shaped) resilient matrix 28 and a plurality of LDVs 34 scanning reflective portions 32 on upper outer surfaces 30. Each hollow shell 26 can be tuned to be more responsive to one or more frequencies of acoustic signals 14, and/or combinations of one or more shells 26 and individual ones of LDVs 34 can be oriented to cover different sectors 33 of ambient water 18 for different targets 16, if desired. Suitable means for distributing the energy of emitted radiation 36 and reflected radiation 38, including those referred to above, could have expanded capabilities to enable a single LDV 34 to scan reflective portions 32 on more than one hollow shell 26. The data gathered from one or more remotely deployed LDVs 34 could be transmitted to distant monitoring stations (not shown) for evaluation and appropriate responses. Acoustic transducer system 10 could have a separate receiver section 12 and transmitter section 20 with each LDV 34 or have a common receiver section 12 and transmitter section 20 for all of the interconnected LDVs 34. Beam forming by these and other arrangements of constituents referred to herein can enhance detection applications and capabilities. In addition, the separated shells 26 and LDVs 34 could be used to passively determine range as well as direction to multiple targets 16.

Having the teachings of this invention in mind, modifications and alternate embodiments of acoustic transducer system 10 can be made without departing from the scope of the invention. Its uncomplicated, compact design that incorporates structures long proven to operate successfully lends itself to numerous modifications to permit its reliable use under the hostile and demanding conditions encountered during operations in the marine environment. Acoustic transducer system 10 can be fabricated in different physical arrangements from a wide variety of constituents that have proven capabilities to provide long term reliable deployment and acoustic surveillance for targets of interest. Instead of a single LDV 34 with a beam scanner, stepping mechanism 41, or other beam deflector, several LDVs 34 could be used with each being aligned to a single, separate reflective portion 32 on a shell 26, or a single LDV 34 could be used that is aligned with a single reflective portion 32 on a shell 26 to provide monitoring of possible targets passing through a narrowly defined transit lane or choke point. System 10 of the invention can be made in an integrated form with self contained power supplies and can activate an alarm or ordnance when a target 16 is detected.

The disclosed components and their arrangements as disclosed herein all contribute to the novel features of this invention. Acoustic transducer system 10 provides a reliable and capable means having small apertures for sensing high resolution acoustic signals 14 from target 16. Therefore, acoustic transducer system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A transducer system for acoustic signals comprising:
   means for vibrating in response to acoustic signals impinging from ambient water, said responsive vibrating means having at least one portion being reflective of impinging radiation;
   a resilient matrix resiliently supporting said responsive vibrating means, said resilient matrix being in contact with said water;
   a laser Doppler velocimeter transmitting radiation onto said reflective portion and receiving reflected radiation from said reflective portion, said laser Doppler velocimeter generating output signals representative of said acoustic signals; and
   a computer coupled to receive signals representative of said output signals from said laser Doppler velocimeter.

2. The system of claim 1 wherein said resilient matrix transmits said acoustic signals to said vibrating means.

3. The system of claim 2 wherein said resilient matrix is gelatin and said vibrating means is at least one spherical shell.

4. The system of claim 3 wherein said spherical shell is air filled and said reflective portion is on the outer surface of said spherical shell.

5. The system of claim 4 further comprising:
   a plurality of said reflective portions arranged in a pattern on said outer surface.

6. The system of claim 5 further comprising:
   means for distributing said transmitted radiation from said laser Doppler velocimeter to said reflective portions and for distributing said received reflected radiation from said reflective portions to said laser Doppler velocimeter.

7. The system of claim 6 wherein said spherical shell has a diameter equal to one-half the wavelength of one frequency of said acoustic signals.

8. The system of claim 7 wherein said spherical shell resonates at said one frequency to enhance its vibrations and representative signals to said laser Doppler velocimeter.

9. The system of claim 8 further comprising:
a projector of acoustic energy through said water, said acoustic signals being a reflected portion of said projected acoustic energy.

10. The system of claim 9 wherein said computer activates said laser Doppler velocimeter and said projector in timed sequences to determine range to a source of said acoustic signals.

11. The system of claim 10 wherein said distributing means is connected to said computer to indicate the direction to said source and the range to said source.

12. The system of claim 8 wherein said acoustic signals originate and are transmitted from a distant source of acoustic signals directed at and reflected from a target.

13. The system of claim 4 wherein said spherical shell has a diameter equal to one-half the wavelength of one frequency of said acoustic signals.

14. The system of claim 13 wherein said spherical shell resonates at said one frequency to enhance its vibrations and representative signals from said laser Doppler velocimeter.

15. The system of claim 14 further comprising:
a projector of acoustic energy through said water, said acoustic signals being a reflected portion of said projected acoustic energy.

16. The system of claim 15 wherein said computer activates said laser Doppler velocimeter and said projector in timed sequences to determine range to a source of said acoustic signals.

17. The system of claim 11 further comprising:
a plurality of spherical shells each in a resilient matrix, said spherical shells having different diameters and each having at least one portion of its outer surface being reflective of impinging radiation.

18. The system of claim 17 further comprising:
a plurality of laser Doppler velocimeters each transmitting radiation onto at least one of said reflective portions, receiving reflected radiation from said at least one reflective portions, and generating output signals representative of said acoustic signals.

19. The system of claim 18 wherein each of said spherical shells is tuned to be more responsive to a frequency of said acoustic signals, and combinations of said hollow shells and individual ones of said laser Doppler velocimeters are oriented to cover different sectors of ambient water for different targets.

20. The system of claim 4 wherein said reflective portion is comprised of silver paint coated and cured on said outer surface.

21. The system of claim 4 wherein said reflective portion is comprised of reflective metallic materials deposited on said upper surface.

22. The system of claim 4 wherein said reflective portion is comprised of highly reflective spots polished on said upper surface.

23. An acoustic transducer comprising:
an air-filled spherical shell in water for vibrating in response to impinging acoustic signals from said water, said shell having a plurality of reflective portions arranged in a pattern on an outer surface of said shell, said reflective portions each having a reflective coating being reflective of impinging radiation, said shell having a diameter equal to one-half the wavelength of one frequency of said acoustic signals, and said shell resonating at said one frequency to maximize its vibrations;

a gelatin resilient matrix resiliently supporting said shell in contact with said water, said resilient matrix allowing transmission of said acoustic signals therethrough and to said shell;

a laser Doppler velocimeter transmitting radiation onto said reflective portions and receiving reflected radiation from said reflective portions, said laser Doppler velocimeter generating signals from said reflected radiation representative of said acoustic signals, said maximized vibrations maximizing said representative signals from said laser Doppler velocimeter;

a scanner for scanning said transmitted radiation from said laser Doppler velocimeter to said reflective portions and said received reflected radiation from said reflective portions to said laser Doppler velocimeter;

a computer coupled to said laser Doppler velocimeter and said scanner to receive said representative signals from said laser Doppler velocimeter; and a display connected to said computer for displaying said representative signals.

24. The system of claim 23 wherein said acoustic signals originate and are transmitted from a distant source of acoustic signals directed at and reflected from a target.

25. The system of claim 24 wherein said acoustic signals indicate direction to said target.

26. The system of claim 25 further comprising:
a projector of acoustic energy through said water, said acoustic signals being a reflected portion of said projected acoustic energy.

27. The system of claim 26 wherein said acoustic signals indicate direction and range to said target.

28. A method of providing acoustic sensing in water comprising the steps of:
impinging acoustic signals from ambient water onto a spherical shell having at least one reflective portion being reflective of impinging radiation, said acoustic signals causing said shell and said reflective portion to vibrate;

resiliently supporting said shell in a resilient matrix, said resilient matrix being in contact with said water and transmitting said acoustic signals to said shell and reflective portion;

transmitting radiation from a laser Doppler velocimeter onto said reflective portion;

receiving reflected radiation from said reflective portion with said laser Doppler velocimeter;

generating output signals representative of said acoustic signals with said laser Doppler velocimeter; and receiving signals representative of said output signals in a computer from said laser Doppler velocimeter.

29. The method of claim 28 further comprising the steps of:
forming said resilient matrix of gelatin;
filling said shell with air; and
placing said reflective portion on the outer surface of said shell.

30. The method of claim 29 further comprising the steps of:
arranging a plurality of reflective portions in a pattern on said outer surface;
distributing said transmitted radiation from said laser Doppler velocimeter to said reflective portions; and
distributing said received reflected radiation from said reflective portions to said laser Doppler velocimeter.

31. The method of claim 30 further comprising the step of:
projecting acoustic energy through said water, said acoustic signals being a reflected portion of said projected acoustic energy.

32. A method of providing acoustic sensing in water comprising the steps of:
impinging acoustic signals from ambient water onto an air-filled spherical shell having a plurality of reflective portions arranged in a pattern on an outer surface on said shell, said acoustic signals causing said shell and said reflective portions to vibrate, said reflective portions each having a reflective coating being reflective of impinging radiation, said shell having a diameter equal to one-half the wavelength of one frequency of said acoustic signals, and said shell resonating at said one frequency to maximize its vibrations;
resiliently supporting said shell in contact with said water by a gelatin resilient matrix,
transmitting said acoustic signals through said resilient matrix to said shell;
transmitting radiation onto said reflective portions from a laser Doppler velocimeter;
receiving reflected radiation from reflective portions by said laser Doppler velocimeter;
generating representative signals by said laser Doppler velocimeter from said reflected radiation representative of said acoustic signals, said maximized vibrations at said one frequency maximizing said representative signals from said laser Doppler velocimeter;
scanning said transmitted radiation from said laser Doppler velocimeter to said reflective portions and said received reflected radiation from said reflective portions to said laser Doppler velocimeter;
receiving said representative signals from said laser Doppler velocimeter by a computer; and
displaying said representative signals on a computer display.

33. The method of claim 32 further comprising the step of:
projecting acoustic energy through said water, said acoustic signals being a reflected portion of said projected acoustic energy.

34. The method of claim 32 wherein said resilient matrix is dome-shaped.

35. The system of claim 1 wherein said resilient matrix is dome-shaped.

36. The system of claim 18 wherein each resilient matrix is dome-shaped.

\* \* \* \* \*